UNITED STATES PATENT OFFICE.

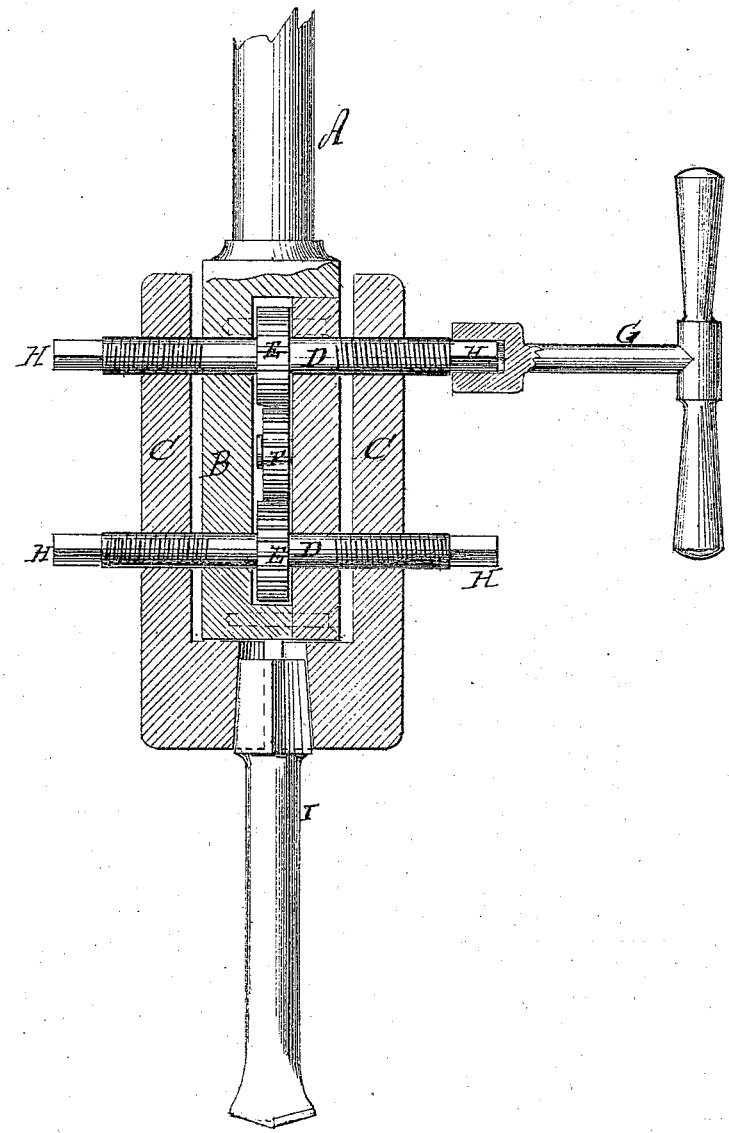

CHARLES E. ALBRO, OF FULTON, NEW YORK.

IMPROVEMENT IN LATHE-CHUCKS.

Specification forming part of Letters Patent No. 120,015, dated October 17, 1871.

*To all whom it may concern:*

Be it known that I, CHARLES E. ALBRO, of Fulton, in the county of Oswego and State of New York, have invented a new and useful Improvement in Chucks; and I do hereby declare that the following is a full, clear, and exact description thereof, which will enable others skilled in the art to make and use the same, reference being had to the accompanying drawing forming part of this specification.

My invention consists in the improvement of lathe-chucks, as hereinafter fully described and subsequently pointed out in the claim.

The accompanying drawing represents a longitudinal section of the chuck.

A is the shank, which enters the spindle of the lathe, by which the chuck is revolved. B is the chuck-bar, with which the shank is connected. C C are two movable jaws, which are supported and moved by the screws D D. These screws have each a right-hand thread on one end and a left-hand thread on the other. These screw-threads engage with corresponding threads cut in the jaws. Each screw D D has a cog-wheel, E, upon it, and an intervening wheel, F, by which the motion is conveyed from one screw to the other; but the intervening wheel may be dispensed with, if desired, and the two wheels E be made to engage directly with each other, or be used independently of each other. These gear-wheels work in a slot or mortise in the chuck-bar, as seen in the drawing. By this arrangement it will be seen that the screws D D have no longitudinal movement, and, by virtue of the right and left-hand threads in the jaws, the rotation of the screws will carry the jaws toward or from the center, according as the screws are turned, thus bringing a drill or other tool or article to a true center by simply turning the wrench G on either of the ends H. I represents a drill. In the ends of each of the jaws there is a V-shaped recess for receiving the shank of a drill or other tool, a screw-tap or nut, or bolt for cutting screw-threads or articles for being drilled, bored, or turned by stationary drills or turning-tools.

The main object in using two screws is to move the jaws parallel with each other to and from the center. A single screw with the right and left-hand threads will move the jaws, and some device other than the second screw and the gearing may be employed for keeping the jaws parallel.

The two screws D D may be employed, arranged as shown, without any gear-wheels, if desired; but I prefer the arrangement shown.

Having thus described my invention, I claim as new and desire to secure by Letters Patent—

The shank having bar B, the two movable jaws C C, the right and left-swiveled screws D D, and the spur-wheels E F E, all constructed, arranged together, and operated as described, and for the purpose specified.

CHAS. E. ALBRO.

Witnesses:
   T. B. WASSON,
   SAML. CROMBIE.

(100)